(12) United States Patent
Pond et al.

(10) Patent No.: US 6,206,430 B1
(45) Date of Patent: Mar. 27, 2001

(54) CONNECTOR AND ATTACHMENT MECHANISM FOR A LUMEN

(75) Inventors: Gary J. Pond, Racine, WI (US); Michael S. Butler, Round Lake Heights, IL (US)

(73) Assignee: Inter-Med, LLC., Racine, WI (US)

( * ) Notice: Subject to any disclaimer, the term of this patent is extended or adjusted under 35 U.S.C. 154(b) by 0 days.

(21) Appl. No.: 09/348,861

(22) Filed: Jul. 7, 1999

(51) Int. Cl.[7] ............................. F16L 35/00; F16L 37/00
(52) U.S. Cl. .................................. 285/4; 285/3; 285/381.4
(58) Field of Search ........................... 285/2, 3, 4, 381.4

(56) References Cited

U.S. PATENT DOCUMENTS

| 4,194,509 | 3/1980 | Pickering et al. . |
| 4,629,455 | 12/1986 | Kanno . |
| 4,631,056 | * 12/1986 | Dye ........................................ 285/3 X |
| 4,692,150 | 9/1987 | Cianci et al. . |
| 4,711,473 | 12/1987 | Glover . |
| 4,834,706 | 5/1989 | Beck et al. . |
| 5,145,283 | 9/1992 | Gowen . |
| 5,275,612 | 1/1994 | Bales, Jr. . |
| 5,531,695 | 7/1996 | Swisher . |

FOREIGN PATENT DOCUMENTS

2615266 * 11/1988 (FR) .................................. 285/381.4

* cited by examiner

Primary Examiner—Neill Wilson
(74) Attorney, Agent, or Firm—Ryan Kromholz & Manion, S.C.

(57) ABSTRACT

A fitting and attachment assembly including a connector having a conventional proximal end and a distal end having a barbed portion thereon; said distal end being mateable with fluid delivery tubing. The mating end portion of said tubing including a separable annular collar in abutting relationship with the end of said tubing and a severable heat-shrinkable sleeve positioned externally of said tubing. A mechanism is further provided for severing said sleeve.

12 Claims, 7 Drawing Sheets

CONNECTOR AND ATTACHMENT MECHANISM FOR A LUMEN

BACKGROUND OF THE INVENTION

In the medical and dental fields, it is standard practice to use disposable tubing to connect multiple devices. For example, tubing delivers intervenious medication from a container of medicine to the patient and tubing provides a conduit from a dental tool to a vacuum supply. A luer fitting is commonly used in conjunction with tubing in these various medical and dental settings. Luer fittings are well known in the art and are preferred as they provide standardized connection to fluidly connect two devices. Luer fittings are commonly used in applications in which the connected components are to be reused. However, luer fittings have a drawback in that they too are easily re-usable. It has been heretofore observed that the luer fittings and the tubing extending therebetween has been disconnected, cleaned and re-used. The cleaning and re-using of the tubing does not constitute a safe and sterile practice.

SUMMARY OF THE INVENTION

The present invention relates to the medical and dental field and especially to an application where a piece of tubing is attached to a connector. A luer fitting is a standardized connector used in the medical and dental field to fluidly connect two devices. One of the advantages of utilizing a standard connector such as a luer fitting, is that the connector and tubing to which it is attached can be reused on multiple applications. However, sometimes it is not desirable for the tubing to be reused. The present invention comprises a novel way of connecting the tubing to a medical or dental device such that a portion of the tubing is destroyed when disconnected from the device. This will prevent the user from reconnecting the used tubing and advertently or inadvertently reusing it.

The invention comprises a barbed fitting, a flexible plastic collar, shrink wrap or shrink tubing, fluid delivery tubing, and suture wire or thread. The plastic collar is placed at the end of the fluid delivery tubing and is held in place by the shrink wrap. The suture wire or thread is located within the shrink tubing along the plastic collar-tubing interface. The fitting is provided with a barb. The tubing, along with its collar, slides over the barbed fitting and locks into place. To remove the tubing assembly, the user pulls the suture line and tear the shrink wrap, thereby breaking the connection between the collar and the fluid delivery line. With the shrink wrap removed, the collar can be easily slid back over the barbs on the luer fitting. After pulling the suture line, the end of the fluid delivery tubing will be destroyed and the tubing assembly will not be capable of reuse.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The term "liquid", as used herein, shall be defined as a gas, a liquid, a substance which flows, or a substance which differs from a solid in that it can offer no permanent resistance to change of shape. It shall further include mixtures of gases, mixtures of liquids, and mixtures of gases and liquids.

Figure 1:
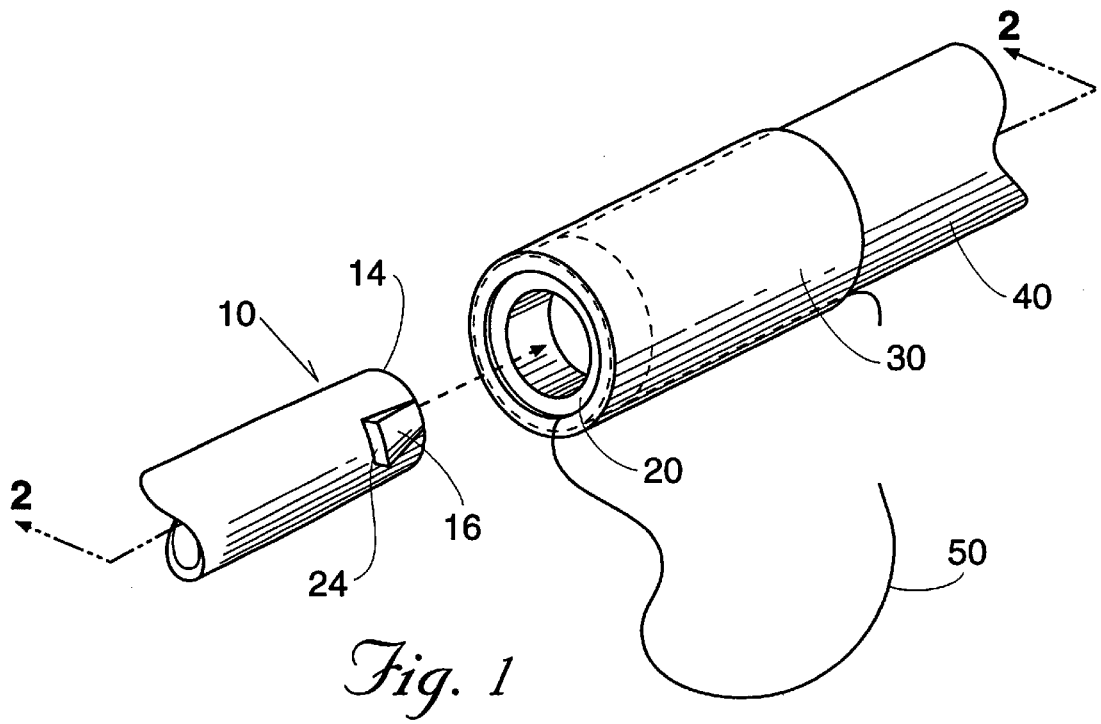
FIG. 1 is a perspective view of the preferred embodiment of the invention showing the barbed fitting disconnected from the fluid delivery tubing.

The term "barb", is intended to include not only the structure shown in FIG. 1, but also any structure that provides an obstruction to meet a surface and resist endwise removal. The term "severing line" as used herein is intended to encompass a single filament, a corded stranded filament, a metallic wire, line such as conventional fishing line, or the like.

The preferred embodiment of their invention can be seen generally in FIGS. 1–5. With particular reference to FIG. 1, the present invention comprises a barbed fitting, indicated generally by the reference numeral 10. The barbed fitting 10 is comprised of a standard or conventional proximal end portion (not shown) and a modified distal end portion 14 having at least one barb 16. The barb 16, as shown in FIGS. 1–4, inclusive, is tapered to provide a ramped surface 17. The ramped surface 17 terminates in a radially extending shoulder 24.

Figure 2:
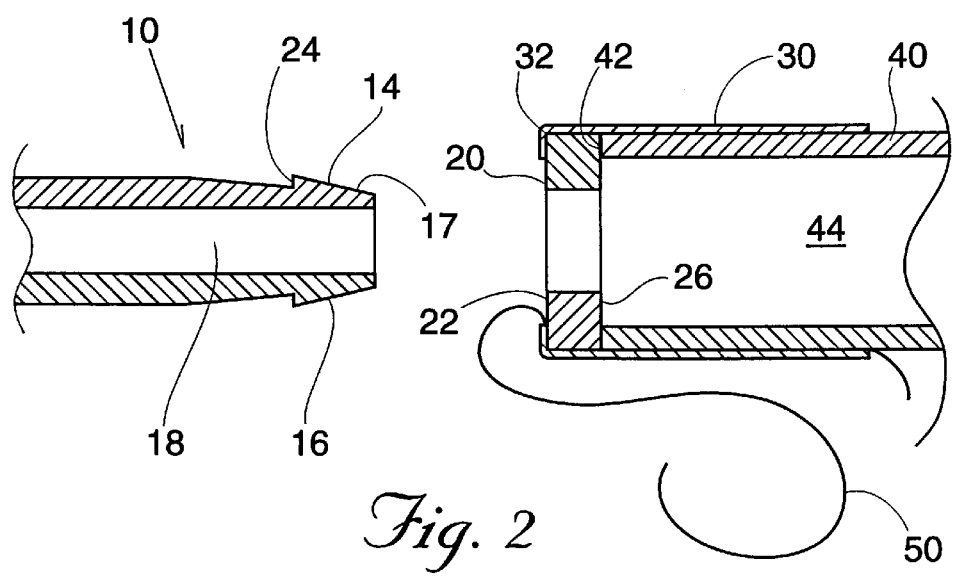
FIG. 2 is a cross sectional view taken along line 2—2 of FIG. 1.

As shown in FIG. 2, the barbed fitting 10 is tubular and includes a coextensive bore 18, which is arranged to receive and communicate with a bore 44 of an elongated, relatively flexible fluid delivery tubing 40. The tubing 40 is of standard flexible plastic commonly used in medical and dental applications. As shown in FIG. 2, the inner surface 26 of a plastic annular collar 20 abuts one end 42 of the tubing 40. The collar 20 is held in abutting relationship with tubing 40 by means of a shrink wrap tubing 30. The opposite end of the tubing 40 (not shown) is arranged for connection with either a vacuum source or, alternatively to a fluid source, such as water for irrigation, medicine, or to an air supply.

Figure 3:
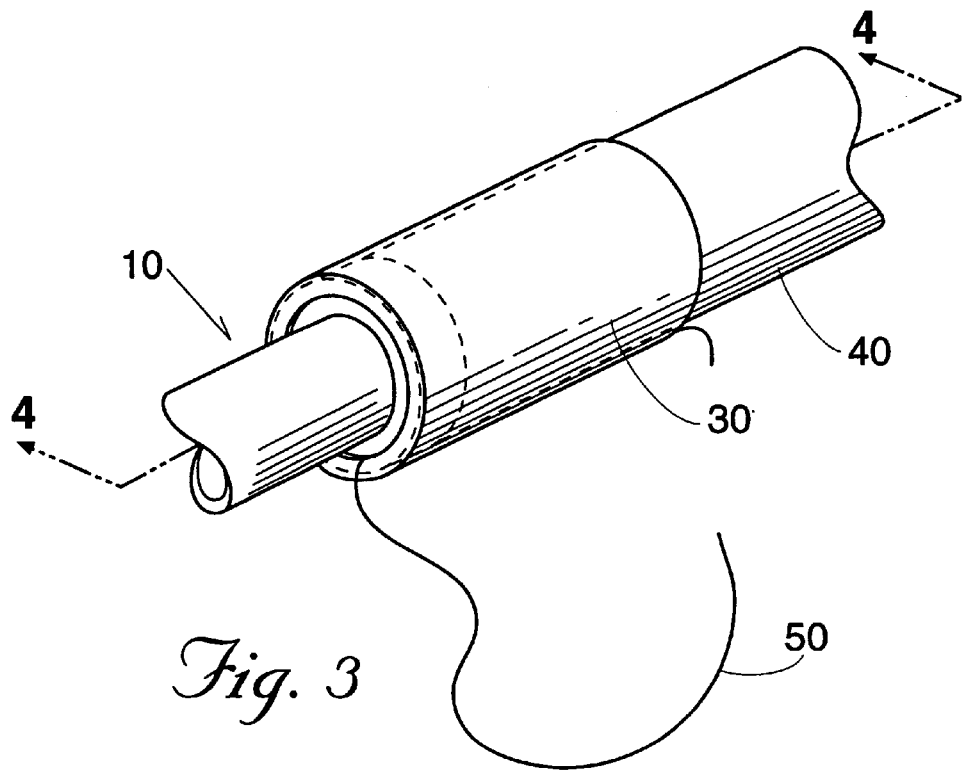
FIG. 3 is a perspective view of the invention showing the barbed fitting inserted in and engaged with the fluid delivery tubing.
Figure 4:
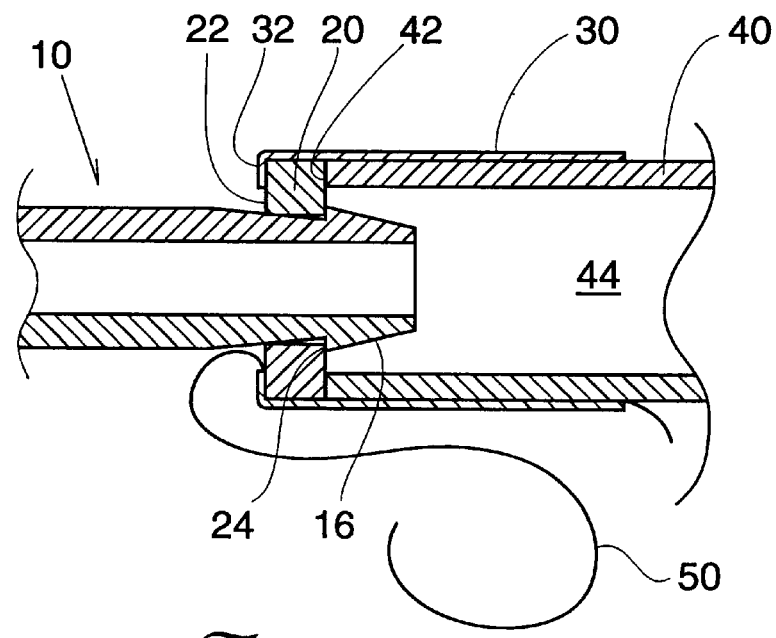
FIG. 4 is a cross sectional view taken along line 4—4 of FIG. 3.
Figure 5:
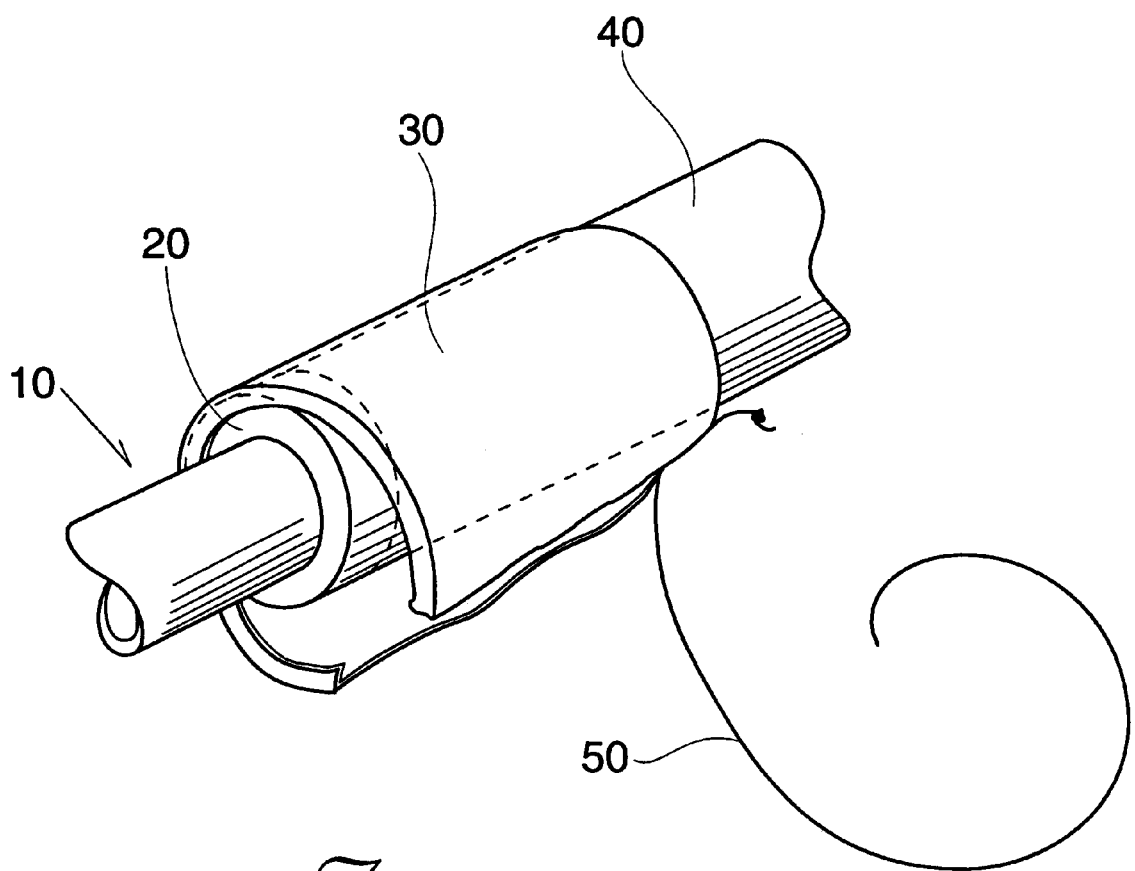
FIG. 5 is a perspective view of the invention showing the suture thread tearing the shrink wrap with the fluid delivery tubing in partial phantom.

It will be observed from FIGS. 3 and 4 that when the barbed fitting 10 is inserted into the tubing 40, the barb 16 engages the collar 20 in a snap-action fit to prevent withdrawal therefrom. Further, the collar 20 is in turn held in its abutting position against the end 42 of tubing 40 by the shrink wrap tubing 30. The shrink wrap tubing 30 provides a radially inwardly extending flange portion 32 engaged with the exterior surface portion 22 of the collar 20. After the dental or medical procedure is completed, the severing line 50 is pulled to tear the shrink wrap tubing 30 away from the fluid delivery tubing 40 (Seen generally in FIG. 5). This prevents the fluid delivery tubing 40 from being inadvertently reused, but yet allows the barbed fitting 10 to be used again with another tubing 40 length.

Figure 6:
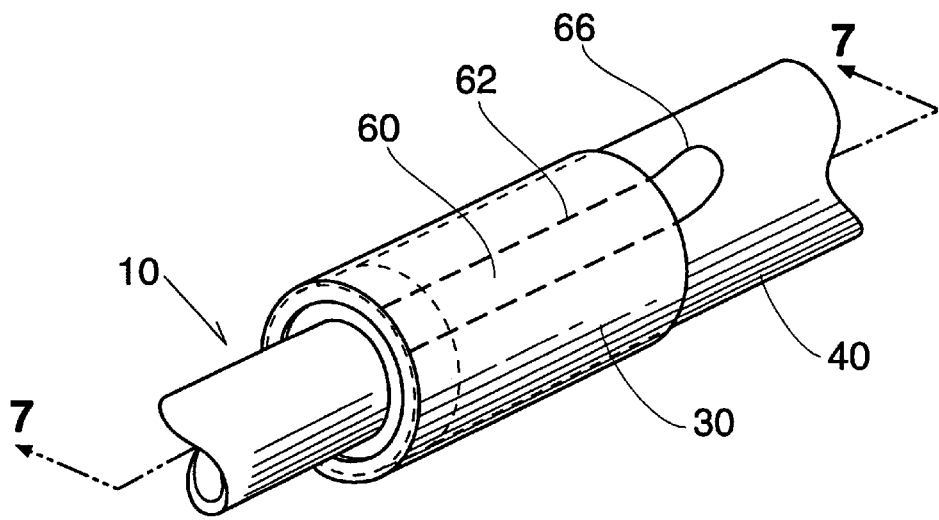
FIG. 6 is a perspective view of an alternate embodiment of the invention showing pre-perforated shrink wrap tubing.
Figure 7:
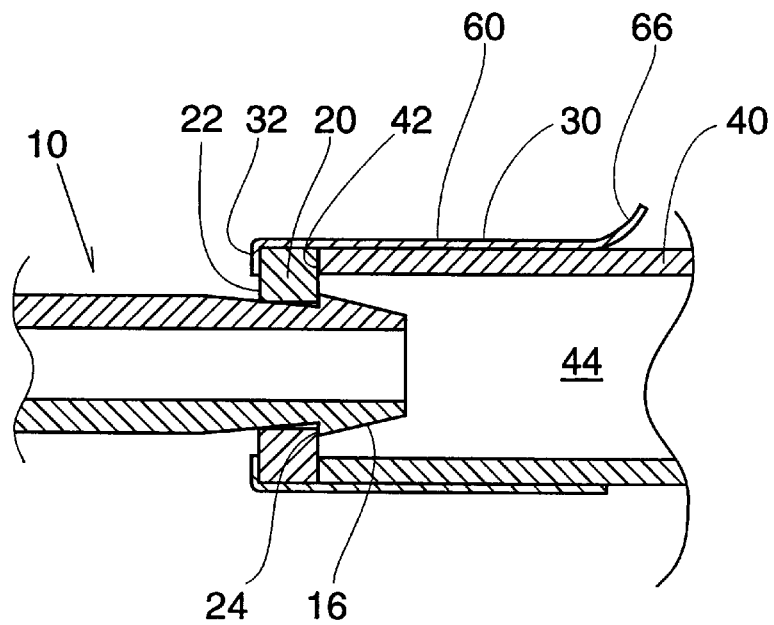
FIG. 7 is a cross sectional view taken along line 7—7 of FIG. 6.
Figure 8:
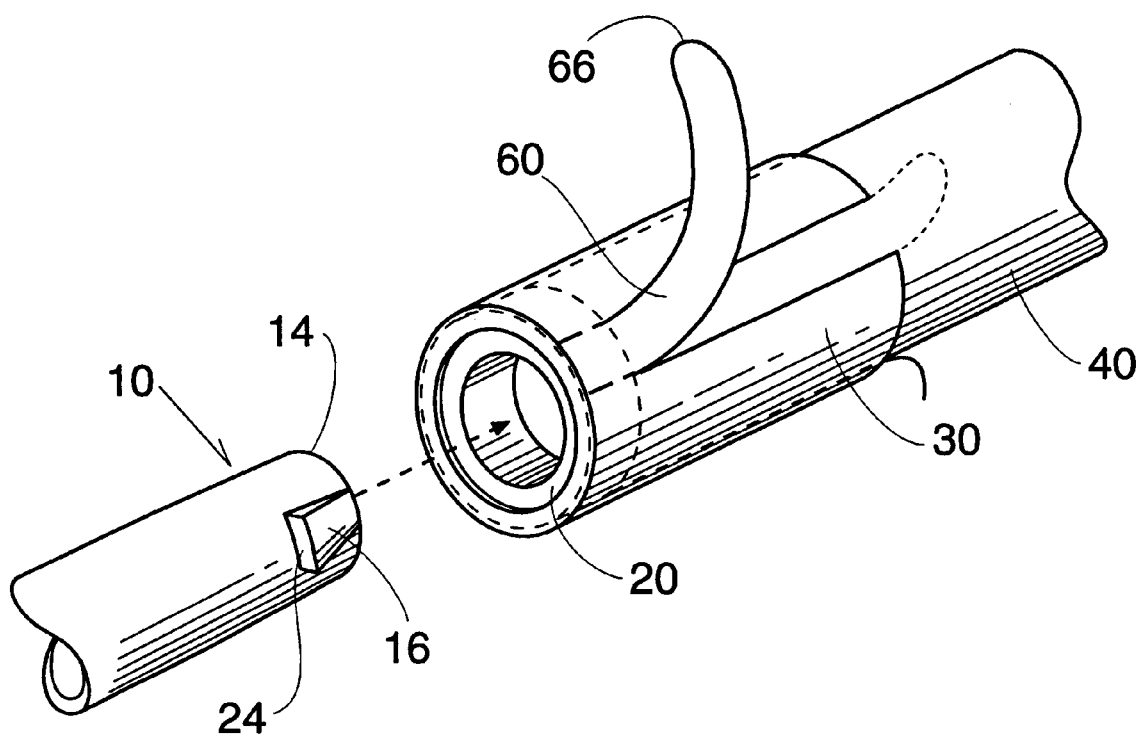
FIG. 8 is a perspective view of the invention showing the pre-perforated portion tearing away from the shrink wrap with the fluid delivery tubing in partial phantom.

In an alternate embodiment, seen generally in FIGS. 6–8, the shrink wrap tubing 30 includes a pre-perforated pull tab 60 for facile manual severing. The pre-perforated pull tab 60 includes perforations 62, and an integrally formed gripping portion 66.

Figure 9:
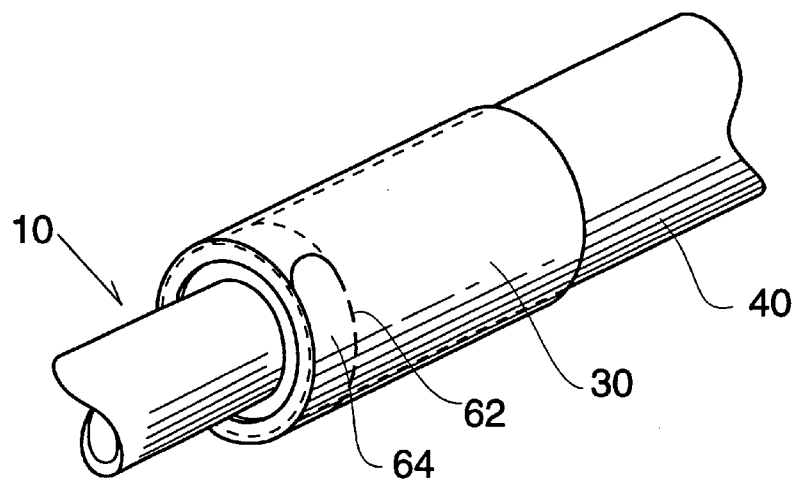
FIG. 9 is a perspective view of an alternate embodiment of the invention showing pre-perforated shrink wrap tubing with perforations in circumferentially-spaced arrangement.
Figure 10:
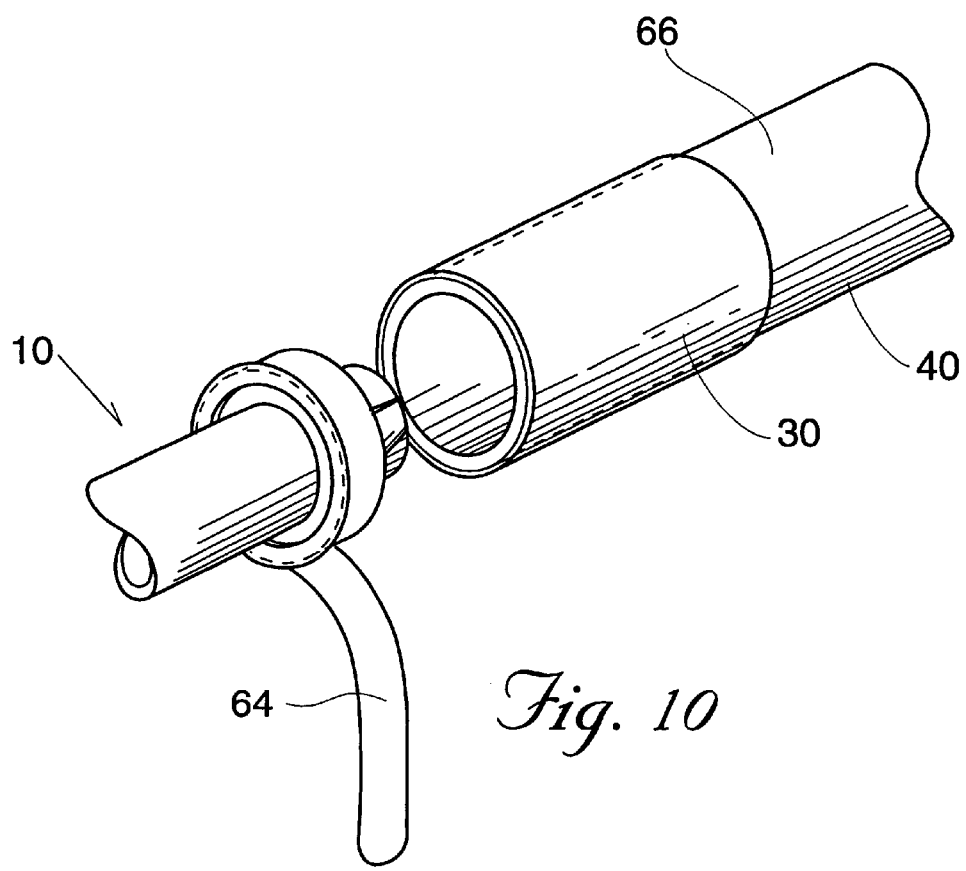
FIG. 10 is a perspective view of the invention showing the circumferentially-spaced perforated portion tearing away from the shrink wrap with the fluid delivery tubing in partial phantom.
Figure 11:
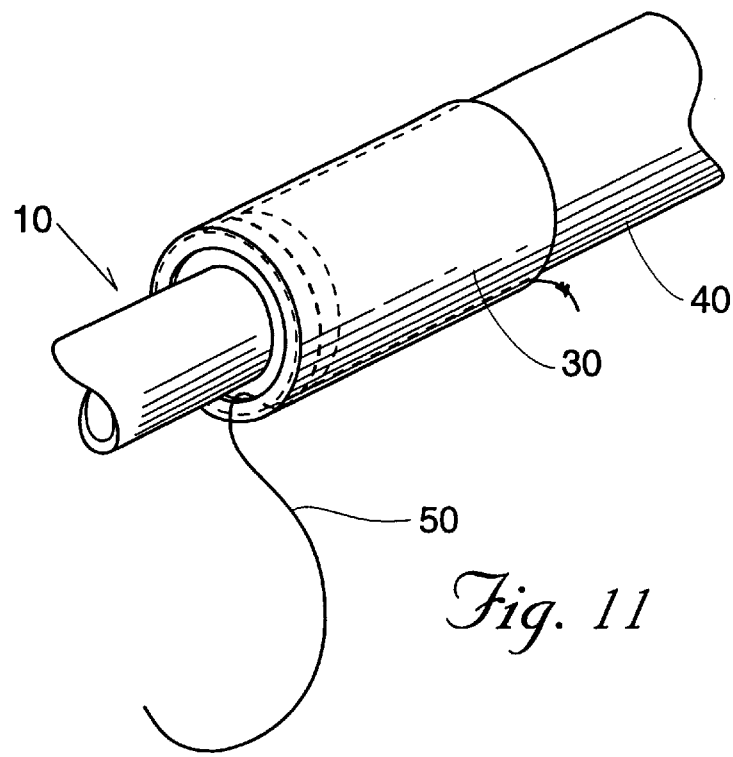
FIG. 11 is a perspective view of an alternate embodiment of the invention showing circumferentially-spaced suture thread.
Figure 12:
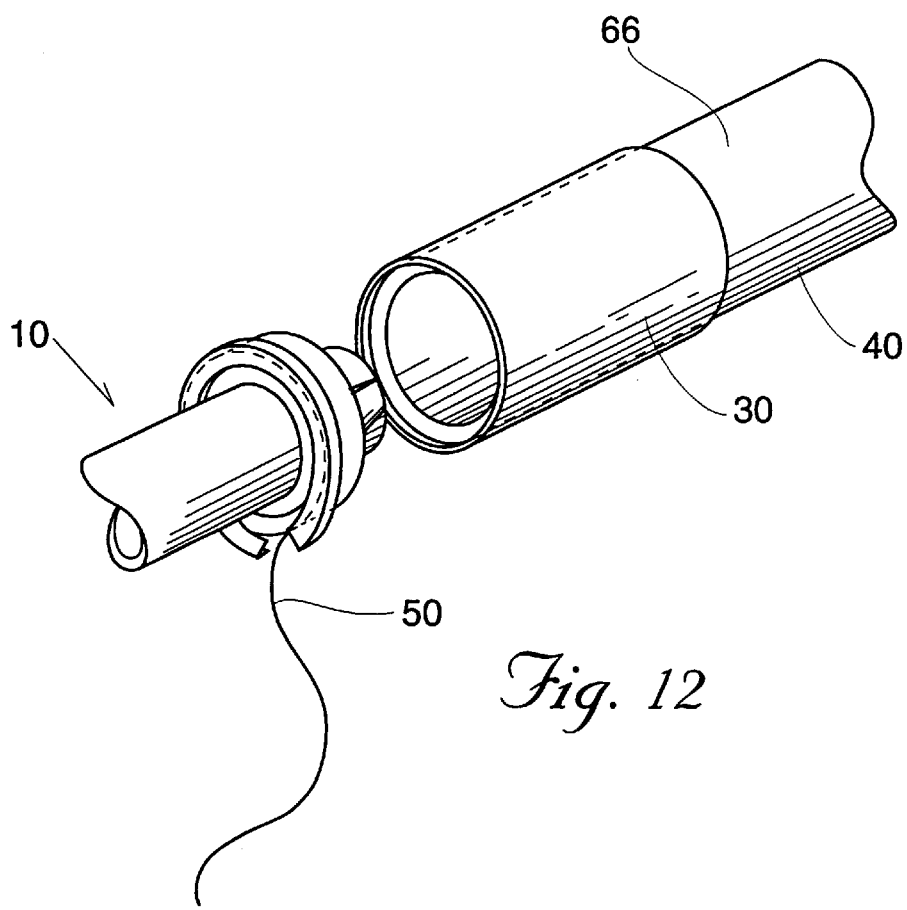
FIG. 12 is a perspective view of the invention showing the circumferentially-spaced suture thread tearing the shrink wrap with the fluid delivery tubing in partial phantom.

The pre-perforated pull tab 60 may be positioned longitudinally relative to the shrink wrap tubing 30, as shown in FIGS. 6–8. Also, it is within the scope of this invention to position the pre-perforated pull tab 60 circumferentially relative to the tubing 30, as seen in FIGS. 11–12. As will be observed, a circumferentially disposed pull tab 64 is shown in detail in FIGS. 9–10. Pull tab 64 may be raised with a finger nail for more facile gripping.

In a further embodiment, seen generally in FIGS. 11–12, the severing line 50, is positioned between and circumferentially spaced relative to the shrink wrap tubing 30 and fluid delivery tubing 40. The severing line 50 is pulled to tear the shrink wrap tubing 30 away from the fluid delivery tubing 40 (seen generally in FIG. 12).

The above described embodiments of this invention are merely descriptive of its principles and are not to be limited. The scope of this invention instead shall be determined from the scope of the following claims, including their equivalents.

What is claimed is:

1. A fitting and attachment assembly comprising:
    a connector having a distal end configured to provide a barbed portion thereon;
    said distal end being mateable with fluid delivery tubing;
    a mating end portion of said tubing including a separable annular collar in abutting relationship with the end of said tubing and a severable sleeve positioned externally of said tubing, said sleeve extending longitudinally beyond the abutting surface of said tubing and including a radially inwardly extending integral portion overlying the exposed surface of said collar acting to retain said abutting relationship; and
    means for severing said sleeve.

2. The assembly of claim 1 wherein said means to sever said shrink wrap portion includes a length of string.

3. The assembly of claim 2 wherein said length of string is positioned between and longitudinally relative to said sleeve and said tubing.

4. The assembly of claim 2 wherein said length of string is positioned between and circumferentially spaced relative to said sleeve and said tubing.

5. The assembly of claim 1, wherein said heat shrinkable sleeve includes a pre-perforated portion.

6. The assembly of claim 1 wherein said barbed portion includes at least one exposed area defining a circumferentially spaced, radially extending locking surface.

7. The assembly of claim 6 wherein said exposed area further defines a ramped surface terminating at its inner end with a radially extending locking shoulder area.

8. The assembly of claim 6 wherein said radially extending locking surface is arranged to engage said annular collar.

9. The assembly of claim 1, wherein the sleeve is formed from heat-shrinkable material.

10. The assembly of claim 1, wherein said barbed portion includes an exposed area defining a continuous, radially extending locking surface.

11. The assembly of claim 10, wherein said exposed area further defines a ramped surface terminating at its inner end with a radially extending locking shoulder area.

12. The assembly of claim 10, wherein said radially extending locking surface is arranged to engage said annular collar.

\* \* \* \* \*